United States Patent [19]

Robinson

[11] Patent Number: 5,443,613
[45] Date of Patent: Aug. 22, 1995

[54] METHOD FOR PRODUCING SUSPENSION FERTILIZER

[76] Inventor: Elmo C. Robinson, P.O. Box 27, Paragonah, Utah 84760

[21] Appl. No.: 231,432

[22] Filed: Apr. 19, 1994

Related U.S. Application Data

[63] Continuation of Ser. No. 736,477, Jul. 26, 1991, abandoned, which is a continuation-in-part of Ser. No. 432,528, Nov. 6, 1989, abandoned.

[51] Int. Cl.$^6$ .............................................. C04F 3/00
[52] U.S. Cl. ............................................ 71/12; 71/13; 71/15; 71/21; 71/23; 71/24; 71/25; 71/28; 71/901
[58] Field of Search ................... 71/9, 11–13, 71/15, 21, 23–25, 901

[56] References Cited

U.S. PATENT DOCUMENTS

| | | | |
|---|---|---|---|
| 3,050,383 | 8/1962 | Wilson | 71/11 |
| 3,111,404 | 11/1963 | Karcher et al. | 71/24 |
| 3,929,446 | 12/1975 | Trocino | 71/23 |
| 3,942,970 | 3/1976 | O'Donnell | 71/12 |
| 3,966,450 | 6/1976 | O'Neill et al. | 71/15 |
| 4,743,287 | 5/1988 | Robinson | 71/12 |

*Primary Examiner*—Ferris Lander
*Attorney, Agent, or Firm*—Michael, Best & Friedrich

[57] ABSTRACT

A high analysis suspension fertilizer containing predetermined amounts of nitrogen and other inorganic plant nutrients is produced from a low plant nutrient-containing organic material, such as animal manure or sewage sludge, by first preparing an aqueous initial suspension of the organic material by admixing with a sufficient amount of water for the organic material to be uniformly dispersed throughout the initial suspension and admixing with the initial suspension a sufficient amount of an acid, such as sulfuric acid, for reacting with the organic material and transforming it into colloidal form, the weight ratio of the acid to the total weight of the organic material in the initial suspension being within the range of about 0.2 to about 2 and the weight ratio of the acid to the total dry weight of the organic material being within the range of about 0.5 to 5. An ammoniacal compound, such as anhydrous or aqueous ammonia, and supplemental compound or compounds for providing the other desired inorganic plant nutrients are added to and admixed with the acidified suspension to produce a finished suspension fertilizer having the desired analysis.

16 Claims, No Drawings

METHOD FOR PRODUCING SUSPENSION FERTILIZER

CROSS REFERENCE TO RELATED APPLICATION

This application is a continuation of U.S. Ser. No. 736,477, filed Jul. 26, 1991, now abandoned, which is a continuation-in-part of U.S. Ser. No. 432,528, filed Nov. 6, 1989, now abandoned.

BACKGROUND OF THE INVENTION

I. Field of the Invention

This invention relates to methods for producing fertilizers from low plant nutrient-containing organic materials and, more particularly, to methods for producing liquid, slurry or suspension fertilizers from such materials.

Organic materials and wastes, such as animal manure, sewage sludge, industrial organic waste and the like, have been used as fertilizers. Such fertilizers contain both inorganic plant nutrients, such as nitrogen and phosphorous, and organic materials capable of being broken down to form a humus which contains humic acid, fulvic acid and humin, and is desirable for conditioning the top layer of soil. For example, the humus enhances the capability of the soil to absorb and retain moisture, produces a soft, friable soil which improves penetration of air and water into the root zone and creates an environment for supporting large population of beneficial soil organisms.

The plant nutrient value of such organic materials and wastes usually is quite low, the total amount of inorganic plant nutrients being as low as 1–5% in some cases. Also, the natural biological process for decomposing the organic materials into the desired humus requires a relatively long time. Because of the low plant nutrient value and the time required for the natural decomposition of the organic materials, synthetic inorganic fertilizers are much more widely used. Some of the inorganic materials can be leached from synthetic fertilizer during rain or irrigation. In addition to not being available as to serve as a plant nutrient, the leached inorganic materials can be carried into and pollute waterways.

II. Prior Art

Processes for treating organic materials and wastes to accelerate break down of the organic material and add inorganic nutrients to form a higher analysis fertilizer are known. Wilson U.S. Pat. No. 3,050,383 discloses a process for producing a high analysis granular fertilizer from a low analysis organic waste material, such as sewage sludge and animal manure, by simultaneously admixing with the waste material sulfuric or phosphoric acid and an aqueous ammoniacal solution and tumbling the resulting reaction mass to form granules.

O'Neill et al. U.S. Pat. No. 3,966,450 discloses a process for simultaneously controlling the odor and increasing the plant nutrient value of an animal waste slurry by admixing therewith an aqueous hydrogen peroxide solution, adjusting the pH to 4–8 by adding a mineral acid and mixing the slurry until the animal waste odor is no longer objectionable and ammonia is converted to an ammonium salt.

O'Donnell U.S. Pat. No. 3,942,970 discloses a process for treating sludge filter cake to produce a granular, high nitrogen fertilizer by introducing comminuted, partially dried sludge filter cake into a reactor, adding an acid to decrease the pH to 3–5 and reacting an alkaline N-methylol-urea aqueous prepolymer solution with the partially-dried, acidified sludge, while vigorously mixing the sludge particles to complete the reaction and conversion of the prepolymer, to produce a granular reaction product comprising the condensed polymer and dried sludge.

Trocino U.S. Pat. No. 3,929,446 discloses a process for producing a fertilizer from Douglas fir bark by extracting wax and removing the cork from the bark and then blending a water soluble nutrient, such as urea, ammonium nitrate or super phosphate, with the remaining matrix.

Applicant's earlier patent, Robinson U.S. Pat. No. 4,743,287, discloses a process for producing a granular or slurry fertilizer product from organic materials and wastes by sequentially blending an acid material and a base material with the organic material in a sealed reactor and maintaining the pressure in the reactor up to 30 psi. A reactor capable of withstanding such pressure can be quite expensive to manufacture and maintain operational. It also can be difficult to maintain pressure seals at the material inlet and outlet and the inlets for the acid and base materials.

SUMMARY OF THE INVENTION

An object of the invention is to provide a simple and cost effective method for producing a high analysis suspension fertilizer from low plant nutrient-containing organic materials and wastes.

Another object of the invention is to provide such a method which can be operated at ambient pressure and with relatively short reaction times.

A further object of the invention is to provide such a method in which the suspension fertilizer product contains inorganic plant nutrients which are physically and/or chemically attached to the organic material in a manner to provide a slow release and resistance to being leached away from the organic nucleus when exposed to water.

Other objects, aspects and advantages of the invention will become apparent to those skilled in the art upon reviewing the following detailed description and the appended claims.

The invention provides a method for producing a high analysis suspension fertilizer containing predetermined amounts of nitrogen and one or more other inorganic plant nutrients from low plant nutrient-containing organic materials. An aqueous suspension of a low plant nutrient-containing organic material is first prepared by admixing such an organic material with a sufficient amount of water to permit the organic material to be substantially uniformly dispersed throughout the suspension. The initial suspension is admixed with a sufficient amount of an acid, such as concentrated sulfuric acid, for reacting with and transforming the organic material into a colloidal form and to provide a weight ratio of the acid to the total weight of the initial suspension within the range of about 0.2 to about 2 and a weight ratio of the acid to the total dry weight of the organic material within the range of about 0.5 to about 5. The reaction of the acid with the organic material is allowed to proceed for a time period sufficient for at least a substantial portion of the organic material to be transformed into a colloidal form and remain substantially suspended in the acidified suspension. An ammoniacal compound, such as anhydrous or aqueous ammonia, and one or more supplemental compounds for providing inorganic plant nutrients other than nitrogen, such as phosphate, potash, calcium, magnesium and other desired micronutrients (trace elements) are admixed with the acidified suspension to provide the desired analysis in the finished suspension fertilizer. If required, sufficient amount of water is added to the acidified suspension to provide an amount of organic material, as dry solids, in the finished suspension fertilizer within the range of about 2 to about 20 weight %, based on the total weight of the finished product after completion of acid reaction. The additional water can be added prior to addition of either the supplemental compounds or the ammoniacal compound, along with either the supplemental compounds or the ammoniacal compound and/or after addition of both the supplemental compounds and ammoniacal compound.

DESCRIPTION OF THE PREFERRED EMBODIMENT

As used herein, the term "low plant nutrient-containing organic material" means organic materials capable of being broken down to form a humus and employed as an organic plant fertilizer, but containing only small amounts of available nitrogen and other inorganic plant nutrients such as phosphate, potash and sulfate. Representative examples of such organic materials include various types of animal manure, such as cattle, horse, swine, sheep and poultry manure, sewage sludge, industrial organic wastes, such as waste from vegetable and fruit canning plants, whey, cotton gins and paper pulping plants, fish scraps, dried blood, bone meal and other materials such as coal, peat, lignite, leonardite, humates, spent mushroom compost, soybean meal, peanut hulls, tobacco stems, cocoa shells and the like. The method of this invention is particularly effective for treating animal manures, either composted or relatively fresh, and various types of sewage sludge.

As used herein, the term "high analysis suspension fertilizer" means a fertilizer made from a low plant nutrient-containing organic material and having a higher nitrogen content, and in some cases a higher content of other inorganic plant nutrients, than the starting organic material. As used herein, the term "suspension" means a pumpable liquid containing uniformly dispersed colloidal particles of an organic material (with nitrogen, and in some cases other inorganic plant nutrients, attached after processing in accordance with the invention), which particles may settle if the liquid remains quiescent for an extended time period, but can be readily returned into a relatively stable dispersed condition by recirculating or otherwise agitating the liquid. Thus, the term "suspension" does not necessarily mean either a true suspension or a true suspension by traditional definitions.

The organic material is first made into an initial aqueous suspension by admixing with a sufficient amount of water to permit the organic material to be substantially uniformly dispersed throughout the initial suspension. The amount of organic material used is that required to provide a total dry weight of organic solids in the finished suspension fertilizer within the range of about 2 to about 20, preferably about 3 to about 9, based on the total weight of the finished suspension fertilizer.

The amount of water used for forming the initial aqueous suspension varies considerably depending upon the type, consistency and moisture content of the organic material being treated and to some extent on the type of mixing equipment used. The same criteria is, for the most part, true for the particle size of the organic material. Generally, only enough water to permit the organic material to be uniformly dispersed throughout the initial suspension is used because the reaction time for the acid to transform the organic material into colloidal form decreases with an increase in solids content of the initial suspension. For example, uncomminuted composted cattle manure can be mixed with water in a tank by a recirculating suspension pump or a conventional paddle type mixer to form a uniformly dispersed suspension having a solids content of about 30 weight % or more. On the other hand, relatively fresh cattle manure usually must be diluted to a solid content in the vicinity of 13 weight % before a uniformly dispersed suspension can be formed. Generally, the dry solids content of the initial suspension is about 5 to about 50 weight %.

Harder, more dense organic materials may have to be ground, shredded or otherwise comminuted so they can be uniformly dispersed as a suspension.

After the initial suspension has been formed, an acid capable of reacting with the organic material and transforming it into colloidal form is added to and blended with the initial suspension, preferably while the initial suspension is being agitated. As used herein, the term "colloidal form" means that the organic material is broken down into humus and the chemical and/or physical properties are changed in a manner to make it capable of remaining substantially suspended in water and also receptive to attachment with nitrogen and other inorganic plant nutrients subsequently added to the acidified suspension. While the specific mechanism of this attachment is not fully understood at this time, it appears that some sort of bonding or complexing occurs because nitrogen and other inorganic plant nutrients remain attached to the organic material in a manner which minimizes their movement through the soil after application of the fertilizer.

The acid can be injected into the suspension by a plurality of spargers or introduced through a pipe or conduit extending to the bottom of a tank or the like. The acid addition can take place in the same tank or container in which the initial suspension is formed or in a separate tank or container. In either case, the tank or container preferably is vented to the atmosphere so that the reaction is carried out at substantially ambient pressure, thereby eliminating costs associated with a sealed reactor vessel.

The acid preferably is a mineral acid, such as sulfuric, phosphoric, nitric or hydrochloric acid and mixtures thereof. Sulfuric acid is preferred and it preferably has a concentration between about 90 and about 98%. The amount of acid added is sufficient to transform substantially all organic material into a colloidal form.

To accomplish the desired transformation of the organic material to a colloidal form, the weight ratio of the acid to the total weight of the initial suspension is within the range of about 0.2 to about 2, preferably about 0.4 to about 1.5, and most preferably about 0.7 to about 0.9 and the weight ratio of the acid to the total dry weight of the organic material is within the range of about 0.5 to about 5, preferably about 1 to about 3. Generally, at weight ratios of the acid to the initial suspension below about 0.2, the reaction time for the acid to transform the organic material to a colloidal form is excessively long and at ratios above about 2, the organic material is adversely degraded and no longer capable of providing the desired soil conditioning. Also, at weight ratios of acid to the total dry weight of the organic material above about 5, the excess acid tends to react with the subsequentially added ammoniacal compound to form salts and/or degrade the organic material and, at ratios lower than about 0.5, substantial amounts of the organic material are not transformed to a colloidal form.

The reaction of the acid with the organic material is exothermic. The time interval for adding the acid varies depending on the particular acid, injection system and pump used and the amount of acid added. The temperature of the suspension during the addition of the acids usually increases to a temperature in the vicinity of 120°–200° F. While the temperature of the suspension preferably is controlled by rate of acid addition, it is within the scope of the invention to either cool or heat the suspension during acid addition. The pH of the suspension after adding the acid usually is below 1 and may decrease to about 0.5 and even lower.

After the acid has been added, the reaction of the acid with the organic material, with or without mixing, is allowed to proceed for a period of time sufficient for all, or at least a substantial portion, of the organic material to be transformed to a colloidal form. This usually can be determined by observing the acidified suspension to detect when the organic material appears to be substantially uniformly suspended throughout the acidified suspension. This reaction time varies depending on the type and amount of acid used and the type and concentration of the organic material in the initial suspension. Generally, the acid reaction time is at least 5 minutes, preferably at least 15 minutes and can be up to several hours. For example, for an initial suspension containing composted cattle manure at a solids content of about 30 weight %, the acid reaction time can be about 15 minutes or less. An initial suspension containing relatively fresh cattle manure at a solids content of about 13% may require an acid reaction time of 24 hours or more.

The acidified suspension preferably is maintained in a substantially quiescent condition during the reaction period following addition of the acid.

After the acid reaction period, a sufficient amount of an ammoniacal compound is added to the acidified suspension to provide the desired nitrogen content in the finished suspension fertilizer and also adjust the pH thereof to an acceptable level. Suitable ammoniacal compounds include anhydrous or aqueous ammonia, nitrogen-containing inorganic compounds, such as ammonium nitrate, ammonium chloride, ammonium sulfate and ammonium phosphate, and organic nitrogen-containing compounds such as urea. Anhydrous and aqueous ammonia are the preferred ammoniacal compounds.

Nitrogen-containing inorganic and organic compounds can be added either in a solid form or as a solution. A mixture of one or more ammoniacal compounds can be used. When anhydrous or aqueous ammonia is used, it preferably is injected into the acidified suspension through one or more perforated pipes located near the bottom of a tank holding the suspension. This, coupled with the vigorous reaction of ammonia with the acid and organic material, usually provides sufficient agitation of the suspension to obtain a homogenous mixing of ammonia with the suspension. Solutions of inorganic and organic nitrogen-containing compounds can be added in a similar manner.

While the reaction temperature of the suspension during addition of the ammoniacal compound is not particularly critical, the ammoniacal compound preferably is added at a rate sufficiently slow to maintain the temperature of the acidified suspension below about 220° F. so as to minimize evaporation. However, this temperature can be allowed to increase to a higher level. The rate at which the ammoniacal compound is added depends on the particular ammoniacal compound, injection system and pump used, the batch size of the suspension and the amount of ammoniacal compound added. Generally, this time interval for adding the ammoniacal compounds ranges from a few minutes up to one or more hours.

When anhydrous ammonia is used as the ammoniacal compound, the suspension may partially gel during addition. When this occurs, the suspension can be agitated to break down the gel and addition of ammonia continued thereafter.

The ammoniacal compound addition can take place in the same tank or container in which the initial suspension is acidified for a batch operation or in a separate tank or container for a continuous operation. In either case, the tank or container preferably is vented to the atmosphere so that the reaction of the ammoniacal compound with the acidified suspension is carried out at substantially ambient pressure, thereby eliminating costs associated with a sealed reactor.

As mentioned above, the amount of the ammoniacal compound added is sufficient to provide the desired available nitrogen content in the finished suspension fertilizer and also control the pH of the finished suspension fertilizer. This can be determined by calculations and/or routine experimentation. In some cases, the nitrogen content of the starting organic materials is so low that it can be ignored when determining the amount of ammoniacal compound to add. However, for organic materials having a nitrogen content of about 2% or more, the amount of the existing nitrogen should be taken into account when making such a determination.

The pH of the finished suspension fertilizer can be within the range of about 3.5 to about 7, preferably about 6.5 to about 6.8. When the pH is below about 3.5, the finished suspension fertilizer usually will not contain the desired amount of available nitrogen. When the pH is higher than about 7 and anhydrous ammonia is used as the ammoniacal compound, free ammonia evolves from the reaction mixture and is wasted. For some operations, the appropriate amount of ammonia can be determined by detecting for the odor of ammonia above the reaction mixture, measuring the pH or adding a measured amount of ammonia.

Supplemental compounds for providing inorganic plant nutrients, other than nitrogen, can be added to the acidified suspension prior to, concurrently with or after addition of the ammoniacal compound. Representative suitable supplement compounds for providing inorganic plant nutrients include phosphoric acid, urea (when necessary to supplement the available nitrogen added by the ammoniacal compound), superphosphates (18–20% $P_2O_5$), triple phosphate (45–50% $P_2O_5$), ground phosphate rock, such as apatite, potash materials, such as muriate of potash (50–60% $K_2O$), kainite (12.5% $K_2O$), calcium, magnesium and compounds of trace elements, such as iron, zinc, copper, molybdenum and manganese in water soluble form. Like nitrogen, the amounts of other inorganic plant nutrients in some organic materials are so low that they can be ignored when determining the amounts of supplemental compounds to add. Also like nitrogen, the amounts of inorganic plant nutrients in starting organic materials may be high enough to require the existing amount to be taken into account when determining how much of each supplemental compound to add.

As mentioned above, the amount of water used to form the initial suspension preferably is kept to a minimum in order to minimize the acid reaction time. Thus, the suspension usually must be diluted with additional water to provide the desired amount of organic material, as dry solids, in the finished suspension fertilizer. When water must be added to provide such a solids content, it is added after completion of the acid reaction. All or part of the additional water can be added prior to addition of either the supplemental compounds or the ammoniacal compound, along with either the supplemental compounds or the ammoniacal compound and/or after addition of both the supplemental compounds and the ammoniacal compound. When anhydrous ammonia is used, the additional water preferably is added prior to the addition of ammonia so as to increase the volume of the reaction medium and thereby decrease the time interval for introducing the ammonia.

The finished suspension fertilizer can be applied in any suitable manner, such as by spraying on the surface of the ground in the vicinity of the plants to be fertilized, sub-surface injection or spraying on the plant foliage.

After the addition of the ammoniacal compound and the supplemental compounds, the resulting suspension may contain unreacted particulate materials, such as straw or the like, which are large enough to plug passages in the application equipment, such as spray nozzles. In that case, such materials can be removed in any suitable manner, such as by passing the finished suspension fertilizer through an appropriate size screen or other suitable filtering means to remove particles larger than the smallest opening in the application equipment. Also, grit and sand can be introduced with the starting organic material, particularly animal manure. This can be removed by passing the suspension through a strainer or grit channel.

The following example is intended to exemplify a preferred embodiment of the invention and is not to be construed as a limitation thereof.

EXAMPLE

The following formulation is used to prepare 2000 lbs of a 4-4-0(N-P-K) suspension fertilizer from a composted cattle manure having a moisture content of 17.6 weight % to provide a product containing 4.35 weight % organic material as dry solids, based on the total weight of the finished suspension.

Formulation for 4-4-0 Suspension Fertilizer - Composted Cattle Manure

| Ingredient | Amount, wt %, Based on total weight of finished product |
| --- | --- |
| Dry organic material | 4.35 |
| Water | 68.15 |
| Sulfuric acid | 12.3 |
| Phosphoric acid | 7.0 |
| Soft rock phosphate | 3.5 |
| Ammonia | 4.7 |
| | 100.00 |

105.6 lbs of the composted cattle manure and 184.4 lbs of water are mixed together in a tank by recirculation with a suspension pump for approximately 2-5 minutes to form an initial suspension with the manure substantially uniformly dispersed throughout and containing approximately 30 weight % dry solids. 246 lbs of 93% sulfuric acid are added to and mixed with the initial suspension.

Mixing is terminated and the reaction mixture allowed to stand for approximately 15 minutes or more for the sulfuric acid to complete transformation of the organic materials in the manure to a colloidal form. Following this reaction period, 140 lbs of phosphoric acid, 70 lbs of soft rock phosphate and 1178.6 lbs of water (remaining amount required to provide desired dilution) are added to and mixed with the acidified suspension. 94 lbs of anhydrous ammonia is injected to the bottom of the tank and bubbled into the acidified suspension over a period of approximately 20-30 minutes. The weight ratio of sulfuric acid to initial suspension is $246/290=0.85$ and the ratio of sulfuric acid to dry organic solids is $246/87=2.83$. The pH of the finished suspension fertilizer is 6.5-6.8.

The resulting product can be passed through an appropriate size screen for removing unreacted materials, such as a straw, which could clog spray nozzles of application equipment and then through a grit channel to remove sand and grit introduced with the manure.

From the foregoing description, one skilled in the art can easily ascertain the essential characteristics of the invention and, without departing from the spirit and scope thereof, make various changes and modifications to adapt it to various usages.

I claim:

1. A method for producing a high analysis suspension fertilizer, containing a predetermined amount of available nitrogen, containing a predetermined amount of one or more other inorganic plant nutrients other than nitrogen and having a pH within the range of about 3.5 to about 7, from a low plant nutrient-containing organic material, said method comprising the steps of
   (a) preparing an aqueous initial suspension of a low plant nutrient-containing organic material by admixing said organic material with a sufficient amount of water to permit said organic material to be substantially uniformly dispersed throughout said initial suspension, the total dry weight of said organic material being within the range of about 2 to about 20 weight %, based on the total weight of the finished suspension fertilizer;
   (b) admixing with said initial suspension a sufficient amount of an acid selected from the group consisting of sulfuric, phosphoric, nitric and hydrochloric acids and mixtures thereof to provide a weight ratio of said acid to the total weight of the initial suspension within the range of about 0.2 to about 2 and a weight ratio of said acid to the total dry weight of said organic material within the range of about 0.5 to about 5;
   (c) allowing said acid to react with said organic material under substantially atmospheric pressure conditions for a time period of at least 5 minutes and sufficient for substantially all of said organic material to be transformed into a colloidal form and remain substantially suspended in the resulting acidified suspension;
   (d) admixing with said acidified suspension under substantially atmospheric pressure conditions an ammoniacal compound selected from the group consisting of anhydrous ammonia, aqueous ammonia, ammonium nitrate, ammonium chloride, ammonium sulfate, ammonium phosphate, urea and mixtures thereof and one or more supplemental inorganic compounds required to provide said other inorganic plant nutrient(s), the amounts of said ammoniacal compound and said supplemental inorganic compound(s) being sufficient to provide said predetermined amount of available nitrogen, said predetermined amount of said other inorganic plant nutrient(s) and a pH within said predetermined range in the finished suspension fertilizer; and (e) adding a sufficient amount of water to the acidified suspension after step (c) and prior to, during and/or after step (d), as required, to provide the finished suspension fertilizer with the amount of dry organic material set forth in step (a).

2. A method according to claim 1 wherein said acid is sulfuric acid.

3. A method according to claim 1 wherein said organic material is animal manure or sewage sludge.

4. A method according to claim 3 wherein said ammoniacal compound is anhydrous or aqueous ammonia.

5. A method according to claim 4 wherein said acid is sulfuric acid.

6. A method according to claim 5 wherein the total dry weight of said organic material is about 3 to about 9, based on a total weight of the finished suspension fertilizer.

7. A method according to claim 6 wherein the weight ratio of said acid to total weight of the initial suspension is within the range of about 0.7 to about 0.9.

8. A method according to claim 5 wherein the weight ratio of said acid to the total weight of the initial suspension is within the range of about 0.4 to about 1.5.

9. A method according to claim 8 wherein the ratio of said acid to the total dry weight of said organic material is within the range of about 1 to about 3.

10. A method according to claim 1 wherein said ammoniacal compound is anhydrous or aqueous ammonia.

11. A method according to claim 1 wherein the total dry weight of said organic material is about 3 to about 9, based on the total weight of the finished suspension fertilizer.

12. A method according to claim 1 wherein the weight ratio of said acid to the total weight of the initial suspension is within the range of about 0.4 to about 1.5.

13. A method according to claim 12 wherein the weight ratio of said acid to the total weight of the initial suspension is within the range of about 0.7 to about 0.9.

14. A method according to claim 1 wherein the weight ratio of said acid to the total dry weight of said organic material is within the range of about 1 to about 3.

15. A method according to claim 1 wherein the time period for step (c) is at least 15 minutes.

16. A method according to claim 1 wherein step (c) is carried out under substantially quiescent conditions.

* * * * *